United States Patent
Plewnia et al.

(10) Patent No.: US 9,094,208 B2
(45) Date of Patent: Jul. 28, 2015

(54) USER IDENTITY MANAGEMENT AND AUTHENTICATION IN NETWORK ENVIRONMENTS

(75) Inventors: Boguslaw Ludwik Plewnia, Mission Viejo, CA (US); Weifeng Yao, Orange, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 365 days.

(21) Appl. No.: 13/324,928

(22) Filed: Dec. 13, 2011

(65) Prior Publication Data
US 2013/0152183 A1   Jun. 13, 2013

(51) Int. Cl.
G06F 17/30 (2006.01)
H04L 9/32 (2006.01)
H04L 29/06 (2006.01)

(52) U.S. Cl.
CPC .......... H04L 9/3213 (2013.01); H04L 63/0884 (2013.01)

(58) Field of Classification Search
None
See application file for complete search history.

(56) References Cited

U.S. PATENT DOCUMENTS

| | | | |
|---|---|---|---|
| 7,194,764 B2 | 3/2007 | Martherus et al. | |
| 7,444,666 B2 | 10/2008 | Edwards et al. | |
| 7,461,248 B2 | 12/2008 | Zhang et al. | |
| 7,673,045 B1 | 3/2010 | Battle et al. | |
| 7,735,117 B2 | 6/2010 | Nadalin et al. | |
| 7,765,584 B2 | 7/2010 | Roskind | |
| 7,814,536 B2 | 10/2010 | Martherus et al. | |
| 7,836,487 B2 | 11/2010 | Walker Pina et al. | |
| 7,845,001 B2 | 11/2010 | Knowles et al. | |
| 7,873,661 B2 | 1/2011 | Schulke | |
| 7,877,492 B2 | 1/2011 | Chawla et al. | |
| 7,900,242 B2 | 3/2011 | Malinen et al. | |
| 2007/0289006 A1 | 12/2007 | Ramachandran et al. | |
| 2009/0240941 A1 | 9/2009 | Lee et al. | |
| 2012/0144457 A1* | 6/2012 | Counterman | 726/5 |
| 2012/0167185 A1* | 6/2012 | Menezes et al. | 726/5 |

* cited by examiner

*Primary Examiner* — Jeffrey Pwu
*Assistant Examiner* — Nega Woldemariam
(74) *Attorney, Agent, or Firm* — Brooks Acordia IP Law, PC; Pejman Yedidsion; David Ripma

(57) ABSTRACT

Systems, devices, and methods for sending, by a first computing device to a second computing device, a set of authentication information; determining, by the second computing device, a globally unique identifier associated with the set of authentication information; determining, by the first computing device, a set of properties associated with the received request based on the determined globally unique identifier; and establishing, by the first computing device, a communication channel to the second computing device, wherein the communication channel is established based on the determined set of properties.

20 Claims, 8 Drawing Sheets

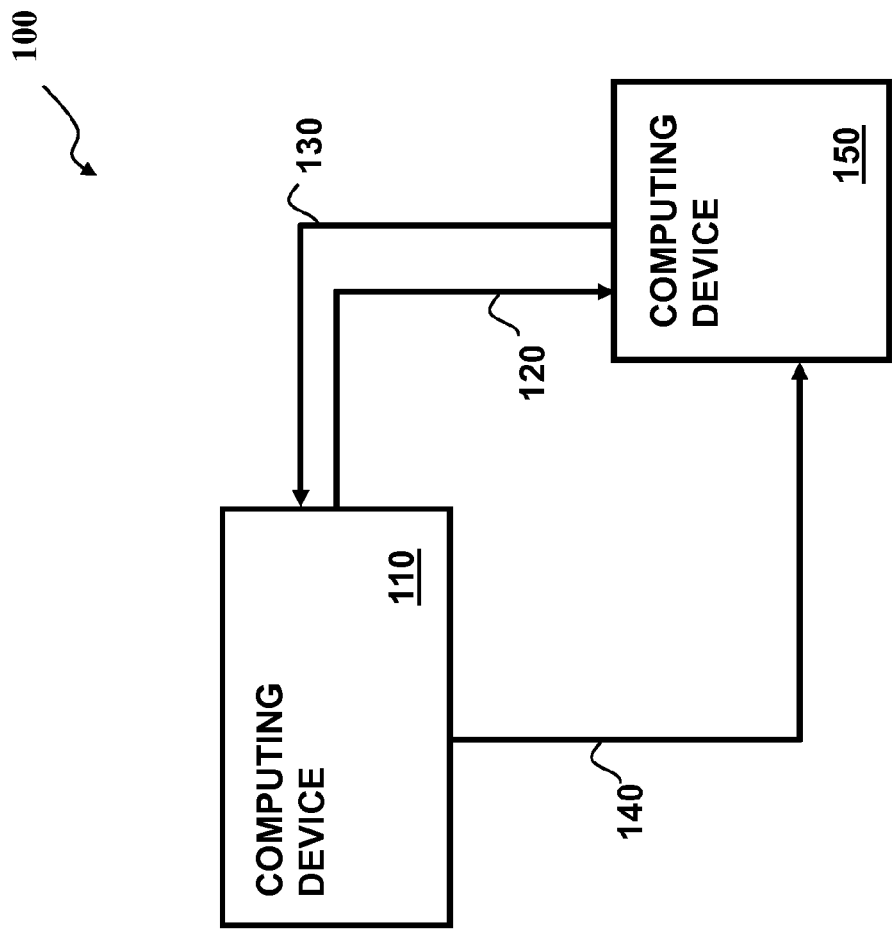

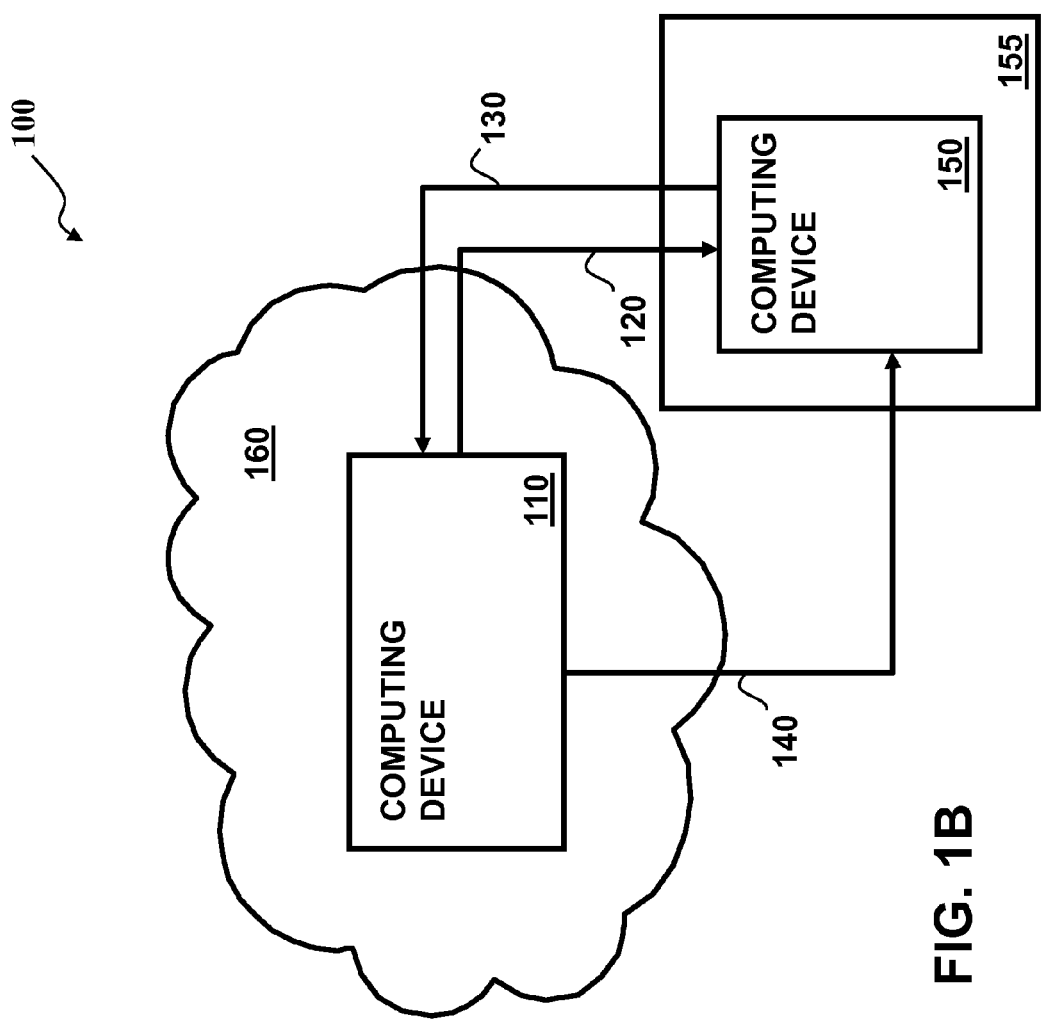

USER IDENTITY MANAGEMENT AND AUTHENTICATION IN NETWORK ENVIRONMENTS

BACKGROUND

Computing network environments may be implemented as a collection of hosts and routers, and the interconnecting network(s), may be managed by a network administrator. In secure network environments, user identity may be specific to a particular security realm. The security token that may have been issued for an authenticated user may have a meaning only within the scope of the security realm. Different secure network environments may have different security repositories, different security software, and/or different security policies. Interoperation between different networks requiring full interoperability may be achieved via a federated network to allow for content sharing between the different networks.

SUMMARY

Embodiments include methods, systems, and devices where, for example a method embodiment may include the steps of: (a) sending, by a first computing device to a second computing device, a set of authentication information; (b) determining, by the second computing device, a globally unique identifier associated with the set of authentication information; (c) determining, by the first computing device, a set of properties associated with the set of authentication information based on the determined globally unique identifier; and (d) establishing, by the first computing device, a communication channel to the second computing device, where the communication channel is established based on the determined set of properties. Optionally, the determining of the set of properties may be via a configuration file, stored at the first computing device, where the configuration file comprises the set of properties. Optionally, the sending of the set of authentication information may be via a security service residing on the first computing device.

In some embodiments, the method may further include the step of: initiating, by the first computing device, a request for execution of an application from a set of one or more applications based on a received request and may be via the established secure communication channel. In some embodiments, the method may further include the step of: executing, by the second computing device, the application from the set of one or more applications based on the initiated request for execution. Optionally, the communication channel may be a secured communication channel. In some embodiments, the method may further include the step of: authenticating, by the second computing device, the set of authentication information. Optionally, the set of authentication information may be encrypted by the first computing device.

Embodiments include methods, systems, and devices where, for example a device embodiment may include: (a) a processor and (b) addressable memory where the addressable memory comprises a set of one or more applications; where the processor is configured to: (i) determine a set of properties associated with a received request, based on a determined globally unique identifier, the received request comprising a set of authentication information; where the determined globally unique identifier is associated with the set of authentication information; and (ii) establish a communication channel based on the determined set of properties. In some embodiments the device may further be configured to: initiate a request for execution of an application from a set of one or more applications based on the received request and via the established communication channel. Optionally, the set of properties may be determined via a configuration file, where the configuration file comprises the set of properties. Optionally, the encrypted set of authentication information may be sent via a security service residing on the device. Optionally, the authentication information is encrypted or the established communication channel is a secure communication channel.

Embodiments include methods, systems, and devices where, for example a system embodiment may include: (a) a first computing device, the first computing device comprising a processor, where the processor is configured to: determine a globally unique identifier based on a received set of authentication information; and (b) a second computing device, the second computing device comprising a processor, where the processor is configured to: (i) determine a set of properties associated with a received request, the received request comprising the set of authentication information; where the determination is based on the globally unique identifier, and where the globally unique identifier is associated with the set of authentication information; and (ii) establish a communication channel based on the determined set of properties. Optionally, the authentication information may be encrypted. Optionally, the established communication channel may be a secure communication channel. In some embodiments, the first computing device may be further configured to authenticate the set of authentication information.

BRIEF DESCRIPTION OF THE DRAWINGS

Embodiments are illustrated by way of example and not limitation in the figures of the accompanying drawings, and in which:

FIG. 1A depicts an exemplary embodiment of a computing system that includes a first computing device and a second computing device;

FIG. 1B depicts an exemplary embodiment of a computing system that includes a first computing device residing at a remote server, e.g., on a cloud server, and a second computing device residing on a network;

DETAILED DESCRIPTION

Figure 2:
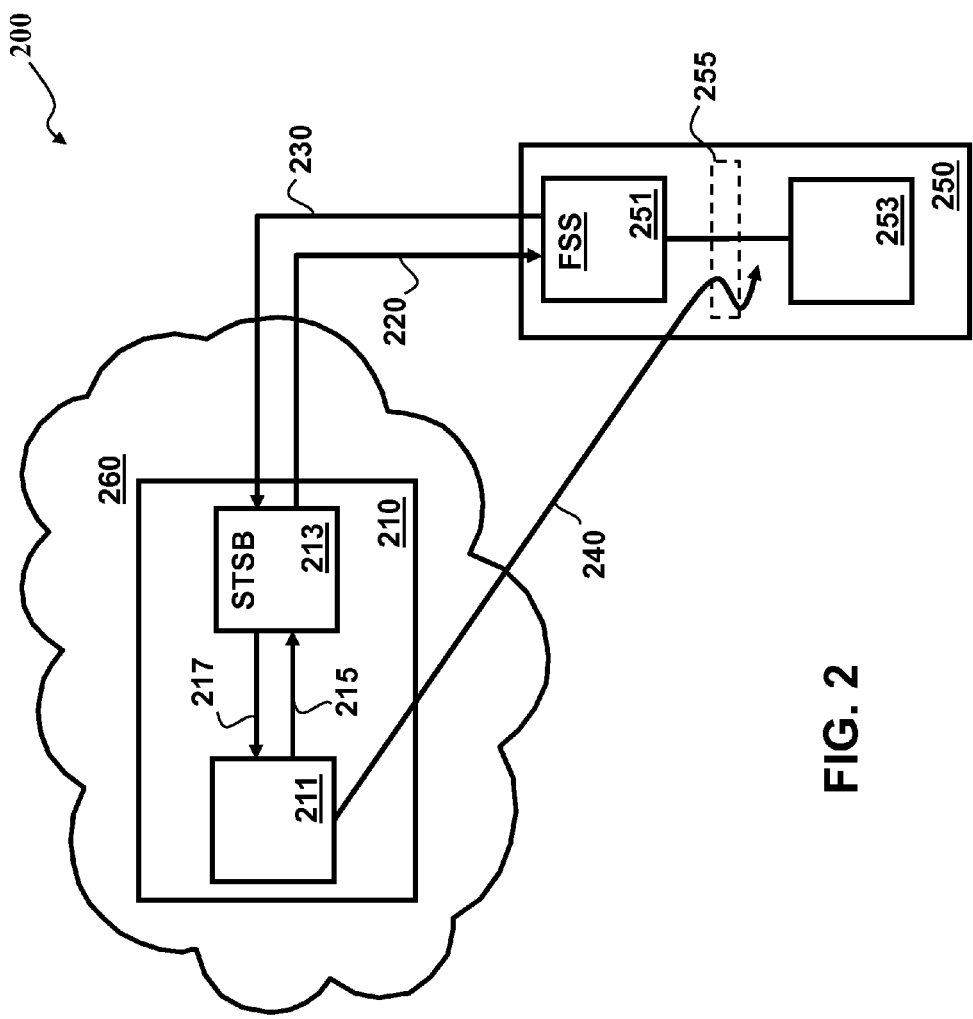
FIG. 2 depicts an exemplary embodiment of a computing system that includes a set of network nodes, a networked environment, and a remote or cloud server.

In a computer networked environment comprising a plurality of networked processing nodes, a first computing device may host a virtual network computing server that may be in communication with a second computing device which may host a virtual network computing server. In some embodiments, the first computing device may act as a remote or cloud environment, e.g., a remote or cloud server, and the second computing device may act as networked environment. The cloud server may deliver computing abilities and provide services such as: shared resources, shared software, and shared information to computers and other devices that may be part of a network. The networked environment may be a collection of principals, e.g., security principals, where the environment may contain user accounts and security information for resources in that network. In some embodiments, a server may be employed to manage the security-related aspects, i.e., interactions and administration, between a user and a network. In some embodiments, the first computing device may communicate with the second computing device via an authentication process. The authentication process may comprise presenting a unique attribute and an associated authentication information by a user in exchange for verification of the user by an authentication provider. Optionally, the second computing device may reside in a network, where the network may comprise servers and clients, for example, comprised of computing devices operation in the client-server model and implemented as part of a wide area network (WAN). Optionally, the second computing device may reside in a network where the nodes may share physical proximity on a local area network (LAN).

In a secured computer networked environment, user identity may be specific to a particular security realm. In some embodiments, a security token that may have been issued for an authenticated user may have a meaning only within the scope of that particular security realm. Different security realms may have different security standards and/or security models, where each standard or model may have their own unique constraints. In one embodiment, multiple computing devices may agree on a uniform standard of operation, i.e., a federated environment. The federated environment may be where the inter-operation of two distinct and previously disconnected network environments may attempt to delegate collective authority of security based on proprietary security models. For example, a cloud server and a network environment may establish a federation scheme with each other where the user identity and associated accounts may be managed via establishing an authenticated federation channel with respective security identity authentication providers specific to each federated environment. In some embodiments, a scheme for federating different networked environments may be established where the different networked environments may internally use proprietary security models for managing user identity.

FIG. 1A depicts an exemplary embodiment of a computing system 100 comprising a first computing device 110 and a second computing device 150. In some embodiments, the first computing device 110 may be prompted to send a message, e.g., an encrypted set of authentication information 120 that may indicate an authentication request from the second computing device 150. In some embodiments, the second computing device 150 may authenticate the encrypted set of authentication information 120, and upon the authentication, may send a message, e.g., an indication or a response, to the first computing device 110, where the message may comprise a globally unique identifier 130. In one embodiment, the globally unique identifier 130 may be associated with the encrypted set of authenticated information 120. In some embodiments, the first computing device 110 may then determine a set of properties associated with the received request based on the determined globally unique identifier 130. The first computing device 110 may then establish a secure communication channel 140 with the second computing device 150, where the secure communication channel 140 may be established based on the determined set of properties 130 received by the first computing device 110.

FIG. 1B depicts an exemplary embodiment of a computing system 100 comprising a first computing device 110 and a second computing device 150. In some embodiments, the first computing device 110 may, for example, be hosted on a cloud server 160, where the cloud server may be configured, via multi-core processors and cloud-specific operating systems, for the delivery of services and execution of applications. In some embodiments, the second computing device 150 may reside on a networked environment 155 implementing a network security model where the network security model may comprise a set of provisions and policies implemented by, for example, a network administrator. In one embodiment, the networked environment 155 may comprise a service, e.g., a federated service or web service, that may establish a communication channel between the first computing device 110 and the second computing device 150. A federated service may be where the inter-operations of two different—and previously disconnected—network environments may attempt to allocate shared security authorization based on proprietary security models. A web service may be a method of establishing a communication channel between two or more network devices over a network environment; the web service may be implemented via, for example, Hypertext Transfer Protocol (HTTP), Extensible Markup Language (XML), Simple Object Access Protocol (SOAP), and/or Web Services Description Language (WSDL). In some embodiments, the first computing device 110 may be prompted to send an encrypted set of authentication information 120 to the second computing device 150 where the second computing device 150 may authenticate the encrypted set of authentication information 120, and upon the authentication, may send a message, e.g., an indication or a response, to the first computing device 110, where the message may comprise a globally unique identifier 130. The first computing device 110 may then determine a set of properties associated with the received request based on the determined globally unique identifier 130 and establish a secure communication channel 140 with the second computing device 150.

FIG. 2 depicts an exemplary embodiment of a computing system 200 comprising a set of network nodes 211, 213, 251, 253, a networked environment 250, and a cloud server 260. A network node 211, 213, 251, 253 may be a computing device that may be attached to a network, and may be able to: send, receive, and/or forward information over a communication channel. In some embodiments, a cloud server 260 may comprise a networked system 210 that includes an application node 211, e.g., a web application host comprising a processor and memory and may execute one or more cloud-based applications and/or scripts at the cloud server 260. In some embodiments, the application node 211 may communicate with the network environment 250, and the application node 211 may execute the one or more cloud-based applications on a network environment 250, via an established secure communication channel 240 with the network environment 250. In some embodiments, the network environment 250 may comprise an optional firewall 255, where the firewall 255 may reside between a network node, e.g., a federated security service (FSS) 251 and a user authentication component 253, e.g., a security agent or identity provider. The application node 211 may access any node or resource behind the optional firewall 255 once the secure communication channel 240 has been established.

In some embodiments, the connection between the cloud server 260 and the network environment 250 may be established after a trust relationship has been formed. The trust relationship may be where the authentication mechanism, i.e., identity verification, for each network environment is recognized by all other network environments employing an authentication mechanism. The cloud-based application running on the application node 211 may send a request 215 to a security node, e.g., a security token service broker (STSB) 213, that may also resides on the cloud server 260. In some embodiments, the STSB 213 may provide a login page that may comprise input fields to collect a set of one or more user credentials associated with a user (not shown). The STSB 213 may effect the authentication of a set of authentication information, e.g., user credentials 220, via a network protocol, e.g., SOAP, that may exchange structured information with another network node, e.g., a federated security service (FSS) 251. Optionally, the user credentials 220 may be encrypted via, for example, a Message-Digest Algorithm (MD5) hash function, by the STSB 213 where the encrypted user credentials 220 may be authenticated by the FSS 251. The FSS 251 may then determine a globally unique identifier 230 that may, for example, be associated with the encrypted user credentials, via accessing a user authentication component 253, e.g., an identity provider. In some embodiments, the FTSB 213 may then determine a set of properties 217 where the set of properties may be associated with the globally unique identifier 230. The cloud-based application running on the application node 211 may then establish a secure communication channel 240 with the network environment 250, where the secure communication channel 240 may be established based on the determined set of properties 217. Optionally, the STSB 213 may determine the set of properties 217 via a configuration file that may, for example, be stored at the STSB 213.

Figure 3:
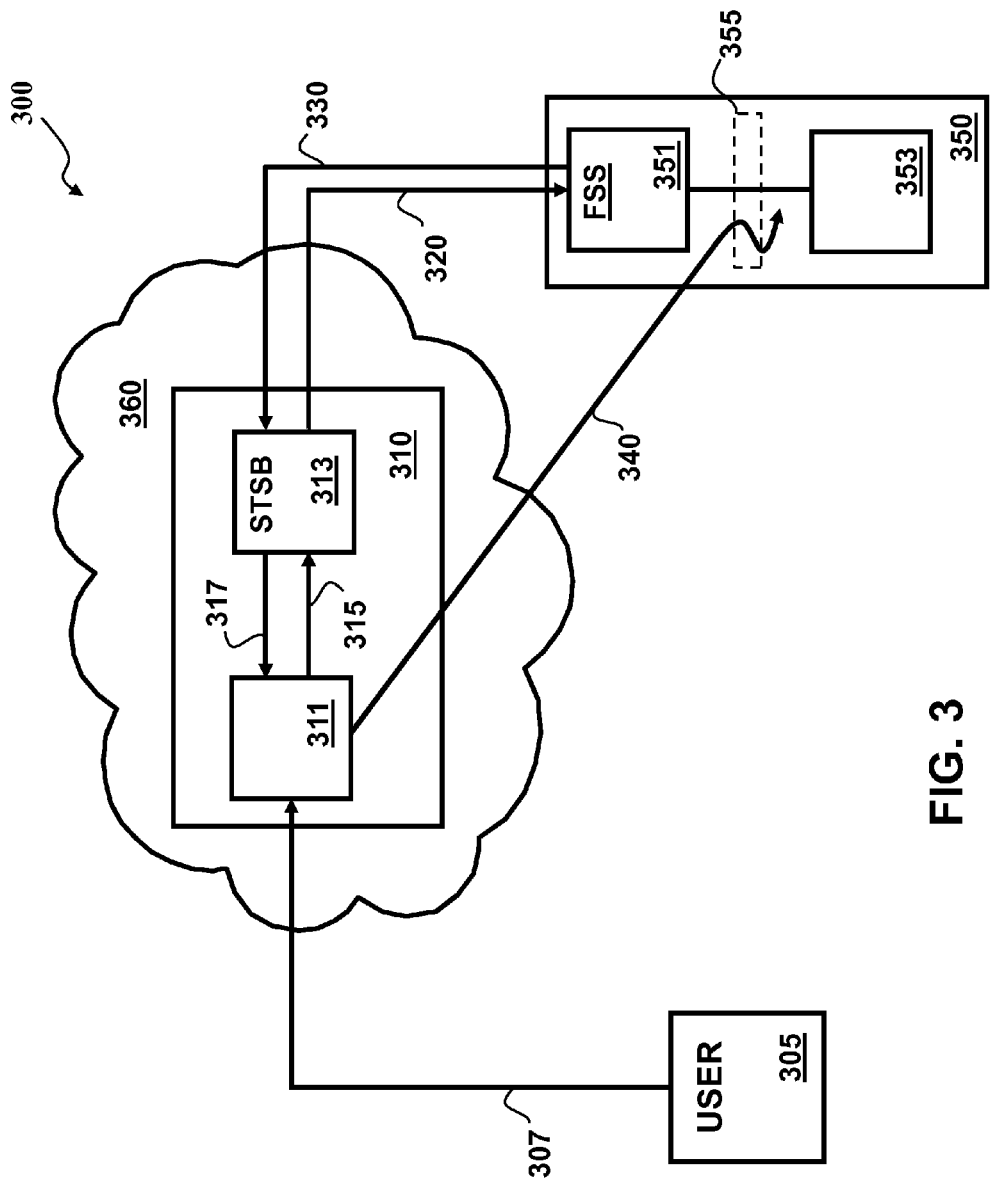
FIG. 3 depicts an exemplary embodiment of a computing system that includes a set of network nodes, a networked environment, a remote or cloud server, and a user.

FIG. 3 depicts an exemplary embodiment of a computing system 300 comprising a set of network nodes 311, 313, 351, 353, a networked environment 350, a cloud server 360, and a user 305. A network node 311, 313, 351, 353 may be a computing device that may be attached to a network, and may be able to: send, receive, and/or forward information over a communication channel. In some embodiments, the application node 311 may receive a user-request 307 from a user 305 via, for example, a browser request. The user-request 307 may be based on a call to a specific location, e.g., Uniform Resource Locator (URL), via a browser that may initiate a call to a cloud-based application that may require an authenticated user. Optionally, once the call is initiated, the user may be forced to be authenticated before proceeding with the application execution. Additionally, the user may invoke an application that may require a service provider to hold a security repository in order to authenticate and authorize users with their associated credentials. In some embodiments, a network security policy may outline rules for particular users to: access computer networks, govern data access, administer web-browsing, usage of passwords, and/or encryption of data. The policies may be expressed as a set of instructions implemented by special purpose network hardware dedicated for securing the network, e.g., security agents and/or nodes.

Figure 4:
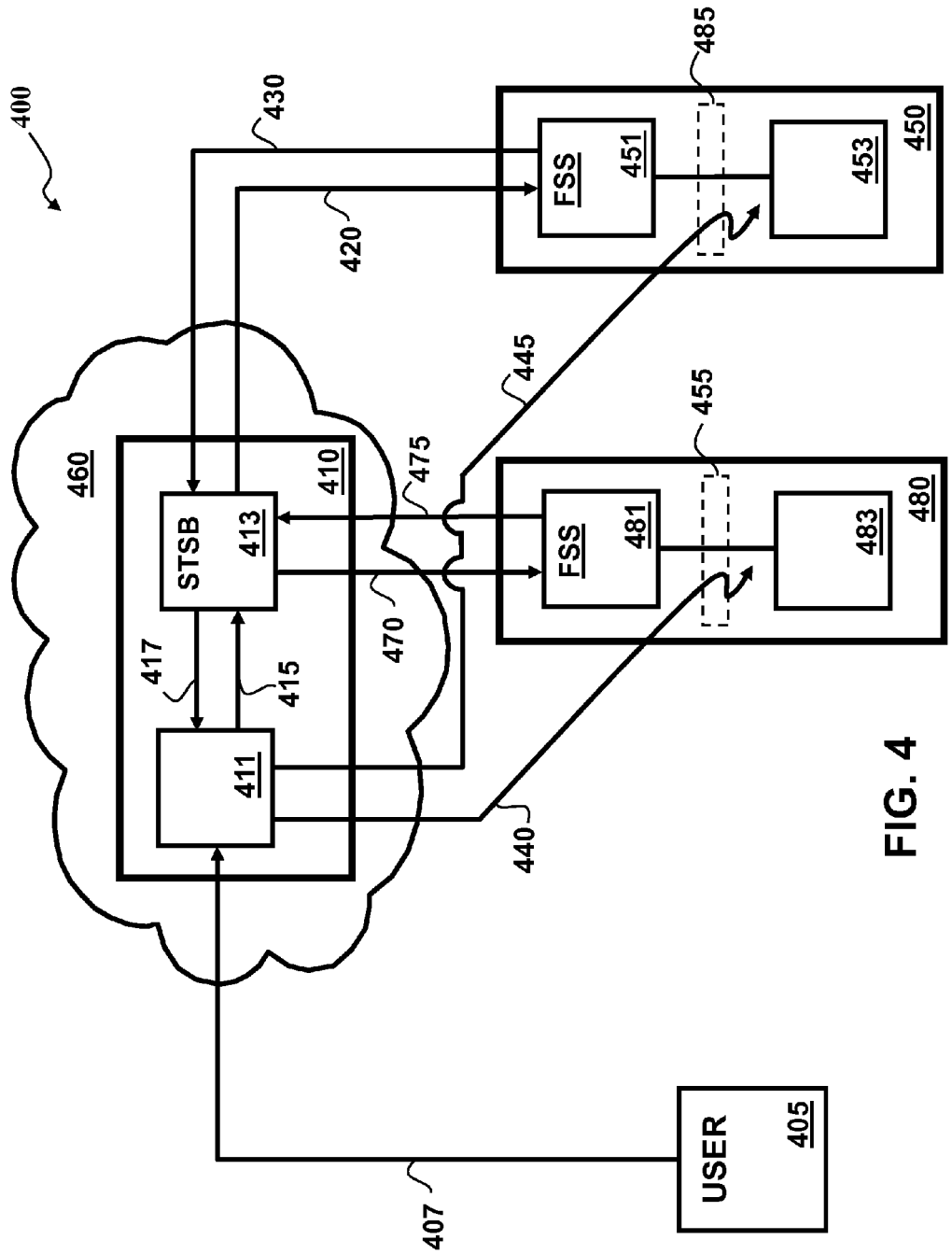
FIG. 4 depicts an exemplary embodiment of a computing system that includes a set of network nodes, a set of networked environments, and a remote or cloud server.

FIG. 4 depicts an exemplary embodiment of a computing system 400 comprising a set of network nodes 411, 413, 451, 453, 481, 483, a set of networked environments 450, 480, a cloud server 460, and a user 405. A network node 411, 413, 451, 453, 481, 483 may be a computing device that may be attached to a network, and may be able to: send, receive, and/or forward information over a communication channel. In some embodiments, the user 405 may send a user-request 407 to an application node that may then established a plurality of secured communication channels 440, 445 with a plurality of network environments 450, 480. In some embodiments, this may be done via authenticating the unique user credentials 420, 470. The STSB 413 may effect the authentication of a set of authentication information, e.g., user credentials 420, 470, via a network protocol, e.g., SOAP. The FSS 451, 481 on each distinct network environment 450, 480, may then access and perform an authentication request with the respective network's user authentication component 453, 483. In some embodiments, the FTSB 413 may then determine a set of properties 417 where the set of properties may be associated with the globally unique identifier 430, 475 associated with each user credentials 420, 470. Subsequent to the user authentication, the application node 411 may establish a unique secured communication channel 440, 445 with each authenticated network environment 450, 480 based on the determined a set of properties 417.

Figure 5:
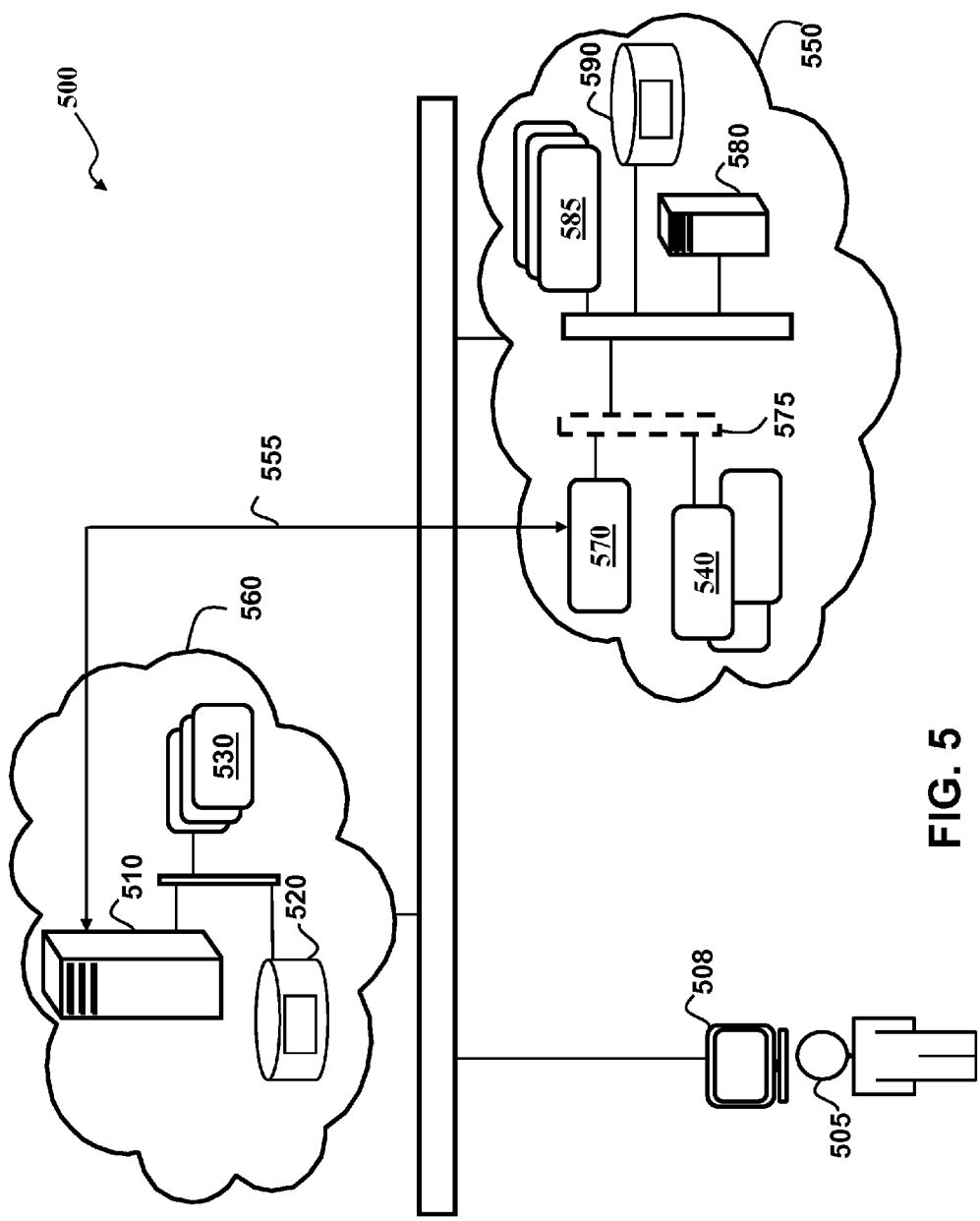
FIG. 5 depicts an exemplary embodiment of a computing system that includes a set of network nodes, a networked environment, and a remote or cloud server.

FIG. 5 depicts an exemplary embodiment of a computing system 500 comprising: a networked environment 550 comprising an FSS 570, a set of publicly accessible applications 540, a set of applications associated with the network 585, a firewall 575, a data store 590, and a user authentication component 580; a cloud server 560 comprising an STSB 510, data store 520, and cloud based applications 530; and a user 505. In some embodiments a mixed security environment—where multiple networks with different security models are in communication with each other—may comprise a cloud environment 560 and a network environment 550. In one embodiment, the network environment 550 comprises a network security environment that may be based on a proprietary security model, for example, a security model that may restrict system access to authorized users such as: role-based access control (RBAC). The computing system 500 may comprise multiple federated environments where a set of one or more of the federated environments may have a proprietary security model in place for user authentication. In one embodiment, a user identity management and user authentication may be employed in the mixed security environment to address the security aspects of user authentication.

In some embodiments, a user 505 may communicate with a resource on the cloud server 560, for example, via a user interface 508, e.g., browser-based access. A security service, e.g., user authentication component 580, may reside on the network environment 550 where it may be responsible for authenticating users and generating security tokens applicable for this security model. The user authentication component 580 may then provide a security statement or identity information, e.g., a claim, associated with a user. A claim may be a statement about a user that may be applied for authentication purposes in an application. In some embodiments, a security token may be created and cryptographically signed, e.g. via an X.509 certificate, by a user authentication component or authority. The signed security token may then be used by a security service responsible for enforcing federation rules. In an embodiment of a client/server computing system running the Microsoft™ Windows™ operating system, a Claims-Based Identity Model may be implemented where claims-aware applications—residing in the cloud server 560—may accept claims that the FSS 570 may have previously authenticated. In some embodiments, a trust relationship may be established between the user authentication component 580 and a set of cloud applications 530 once an authentication has been established.

In some embodiments, the cloud server 560 may comprise a security realm that may employ unique security models and constraints, where the security models may be different from another network environment, for example, a business site. In some embodiments, a federation scheme may be establish with other environments, e.g., organizations, where user accounts for the particular organization may be administered in order that the cloud security layer may not have to administer the user accounts of other organizations. In the embodiment where the particular organization may be administering the user accounts, a trusted federation channel between the respective security identity providers specific to each federated organization may be established. In some embodiments each federated organization may implement a federated service, e.g., via a web service, that may function as a bridge between the cloud environment and the security environment of a particular federated organization.

In some embodiments, a network environment 550, e.g., federated organization, may deploy a service, for example, federated security service, that may serve as a bridge to the user authentication component 580 of a network environment in a given federated security realm. In an embodiment where an application node may be claims-aware, i.e., accept claims that the FSS 570 may have previously authenticated, the claims-aware applications may be deployed in the cloud server 560 where the network environment 550 may be configured to trust the STSB 510, e.g., establish a trust relationship that may allow user identities to be authenticated by a security node, e.g., FSS 570. In one embodiment, the STSB 510 may communicate with the security node, e.g., FSS 570, where applications deployed in the network environment 550 may use any authentication scheme. In some embodiments, the user authentication component 580, e.g. security agent, may manage the accounts of users that may belong to the network environment 550 and/or any outside partners who may belong to different networks. The STSB 510 may implement a secure communication channel 555 with the FSS 570 for the purpose of user authentication. In some embodiments, the FSS 570 may also provide a set of properties about the authenticated user that may subsequently be used by the STSB 510 to generate a set of claims, e.g., identity information such as: name, e-mail address, or age, via the user authentication component 580 performing a user authentication. In one embodiment, the cloud server 560 may have configuration settings in the STSB 510 in order for the STSB 510 to communicate with the federated security service 570 of a particular federated organization. Optionally, the STSB 510 may comprise a URL to the FSS 570 that may be residing on the federated organization. Additionally, the STSB 510 may comprise a set of X509 certificates for message encryption and encoding to and from the FSS 570.

Security Token Service Broker (STSB)

The Security Token Service Broker 510 may be the identity authentication and or provider deployed in the cloud server 560. The STSB 510 may implement a custom interface as defined by the Federated Security Service that is installed at the location of an organization and may have a federation established with the cloud server. In one embodiment, the STSB 510 component may be the master security provider on the cloud server 560. The STSB 510 may be responsible for properly coordinating requests by users for authentication into the cloud server 560 and for generating claims that may be used for authentication purposes by applications, where the claims may be associated with cloud-based applications running on the application node. The STSB 510 may use the federated service of a specific organization to authenticate the account of a user that may be managed on that particular realm. In some embodiments, the authentication process may be effected via the use of a proprietary SOAP interface.

Federated Security Service (FSS)

The Federated Security Service may be a SOAP service that may be installed in a demilitarized zone (DMZ) at the federated organization site, i.e., a perimeter network where an organization's external services 540 may be accessible to other network environments. In an embodiment where a DMZ configuration may be present, the DMZ of the network environment may have a federation established with a cloud server. Optionally, the SOAP interface of the federated service may define the following operations:

ValidateUser(UserID as string, PasswordHash as string) as Guid

GetUserinfo(TokenID as Guid, keys[] as string, flags as unit) as UserDataStructure[]

Login(UserID as string, PasswordHash as string) as Guid

Logout( ) as void

IsLoggedIn( ) as boolean

In an embodiment where the SOAP interface may be implemented, the request and response messages may be encrypted and signed using X.509 certificates, which may enforce the trust relationship, e.g., accepted authentication mechanism, between the STSB and the federated service. In an embodiment where the federated organization network may be implementing an FSS, the FSS may have access to the user authentication component on that network where authenticate requests received from the STSB may be forwarded to. The FSS may enable a federation between the cloud server and federated network.

Detail SOAP Methods Definition

ValidateUser—Checks the username and password and returns a uniqueidentifier (guid) to be used by the login processor, if valid, or throws a SOAP exception if not. The Passwordhash argument is a string (hex) representation of an MD5 hash of the entered password value.

GetUserinfo—This call will request a set of properties about the currently logged in user. The caller specifies the properties that it expects by providing an array of keys as strings. The returned object is an array of name/value pair strings.

IsLoggedIn—Returns true if a user has been logged into the source portal, otherwise returns false.

Login—Logs the user into the source portal. This call should be preceded by a call to ValidateUser to get a valid Token-Guid.

Logout—logs the current user identified by the GUID from the portal. Further use of the GUID or associated security token will be considered invalid.

Figure 6:
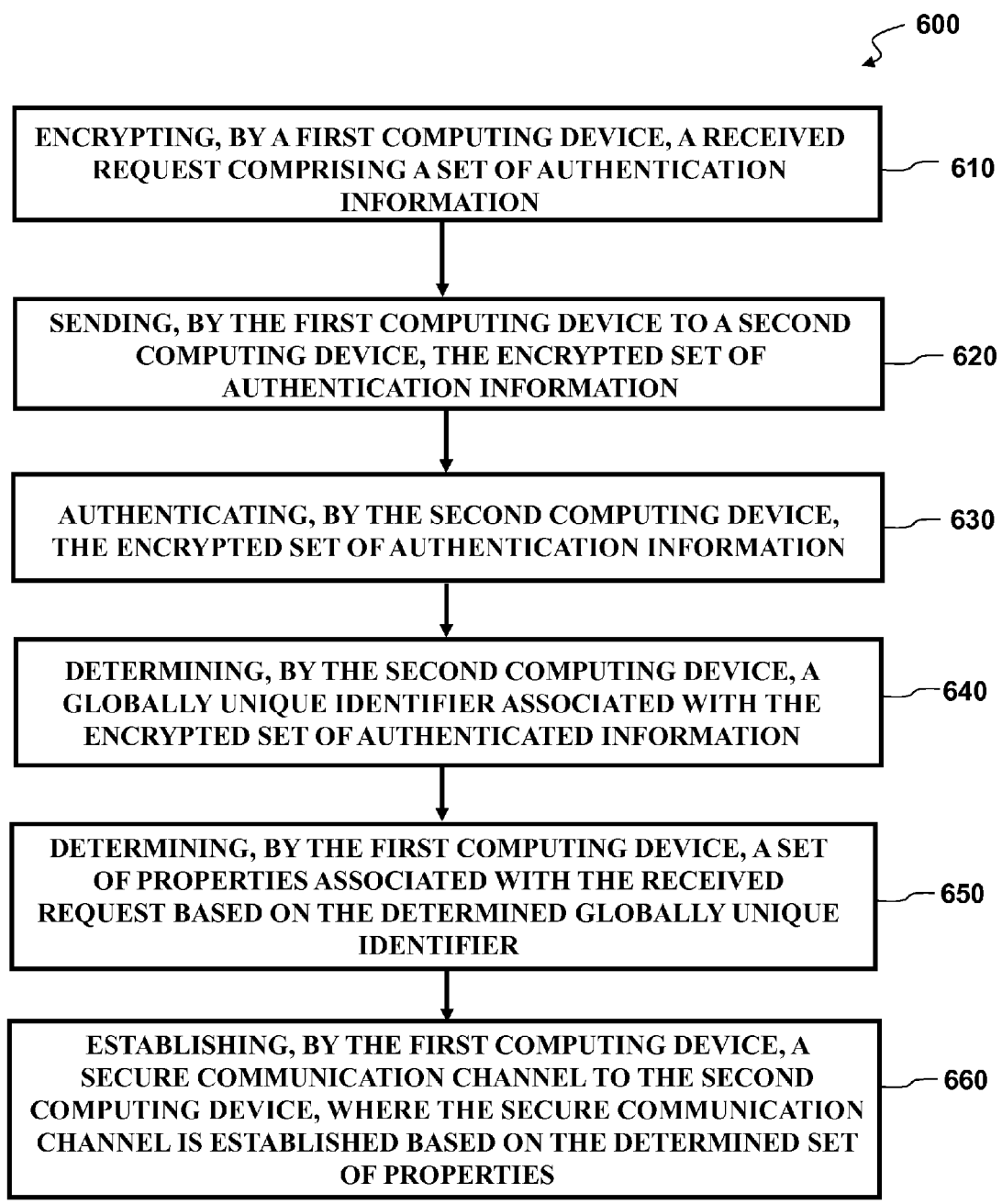
FIG. 6 is a flowchart depicting an exemplary process of a user authentication method in a federated network.

FIG. 6 is a flowchart of an exemplary process 600 establishing a user authentication method in federated networks where the system comprises a computer, and/or computing circuitry, that may be configured to execute the steps as depicted where encryption and decryption are optional. The method depicted in the flowchart includes the steps of: (a) encrypting, by a first computing device, a received request comprising a set of authentication information (step 610); (b) sending, by the first computing device to a second computing device, the encrypted set of authentication information (step 620); (c) authenticating, by the second computing device, the encrypted set of authentication information (step 630); (d) determining, by the second computing device, a globally unique identifier associated with the encrypted set of authenticated information (step 640), (e) determining, by the first computing device, a set of properties associated with the received request where the determining of the set of properties is based on the determined globally unique identifier (step 650), and (f) establishing, by the first computing device, a secure communication channel to the second computing device, where the secure communication channel is established based on the determined set of properties (step 660).

Figure 7:
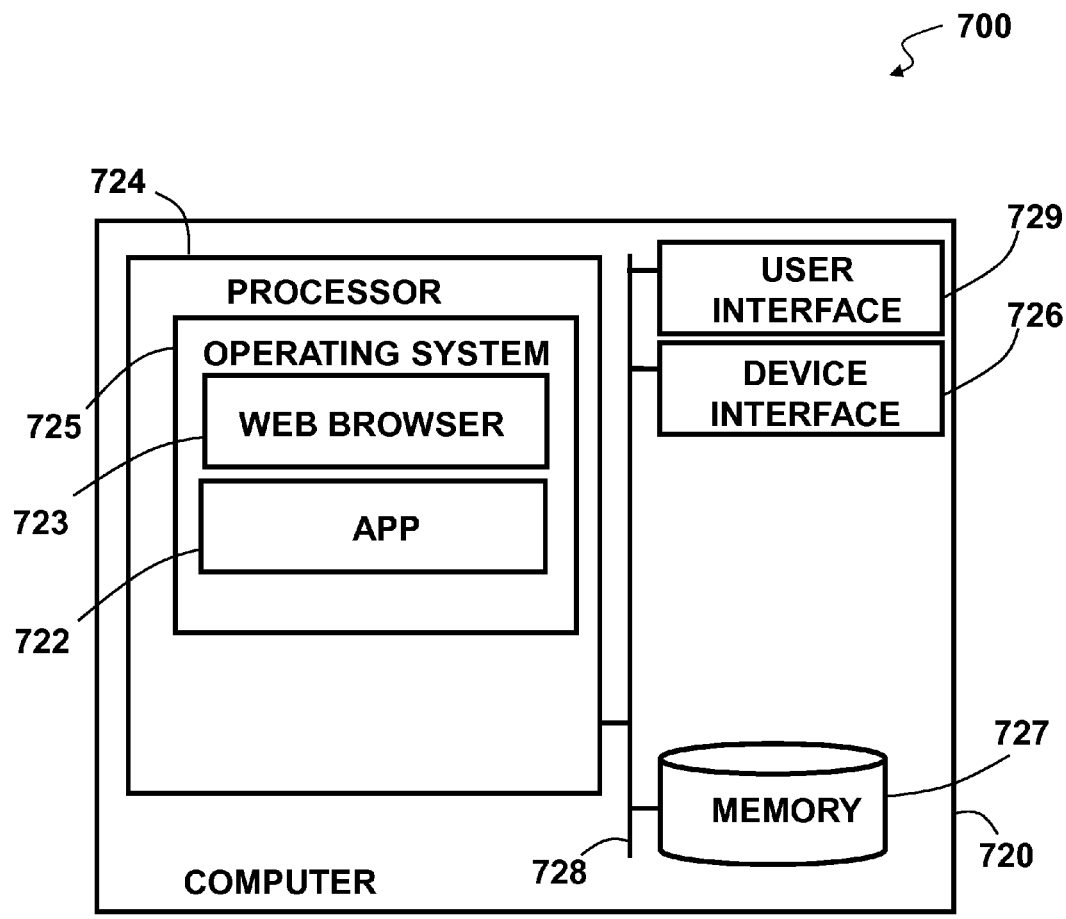
FIG. 7 illustrates an exemplary top level functional block diagram of a computing device embodiment.

FIG. 7 illustrates an exemplary top level functional block diagram of a computing device embodiment 700 of the first computing device 110 or optionally the second computing device 150 of FIG. 1. The exemplary operating environment is shown as a computing device 720 comprising a processor 724, such as a central processing unit (CPU), addressable memory 727, an external device interface 726, e.g., an optional universal serial bus (USB) port and related processing, and/or an Ethernet port and related processing, and an optional user interface 729, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 728. Via an operating system 725 such as one supporting a web browser 723 and applications 722, the processor 724 may be configured to execute steps of a process establishing a communication channel according to the exemplary embodiments described above.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
   sending, by a first node of a first computing device associated with a first proprietary security model to a first node of a second computing device associated with a second proprietary security model wherein the second proprietary security model is different than the first proprietary security model, a set of authentication information;
   determining, by a second node of the second computing device, a globally unique identifier associated with the set of authentication information based on the second node of the second computing device authenticating the set of authentication information;
   sending, by the second node of the second computing device to the first node of the first computing device, the determined globally unique identifier;
   determining, by the first node of the first computing device, a set of properties associated with the set of authentication information based on the determined globally unique identifier;
   establishing a trust relationship between a second node of the first computing device associated with the first proprietary security model and the second node of the second computing device associated with the second proprietary security model based on the determined set of properties;
   establishing, by the second node of the first computing device, a communication channel to a third node of the second computing device, wherein the communication channel is established based on if the trust relationship was established successfully; and
   accessing, by the second node of the first computing device associated with the first proprietary security model, a set of resources on the third node of the second computing device via the established communication channel and based on the globally unique identifier associated with the set of authentication information.

2. The method of claim 1 wherein the determining the set of properties is via a configuration file, stored at the first computing device, wherein the configuration file comprises the set of properties.

3. The method of claim 1 wherein the sending of the set of authentication information is via a security service residing on the first computing device.

4. The method of claim 1 further comprising:
   initiating, by the second node of the first computing device, a request for execution of an application from a set of one or more applications on the third node of the second computing device, based on a received request and via the established secure communication channel.

5. The method of claim 4 further comprising:
   executing, by the third node of the second computing device, the application from the set of one or more applications based on the initiated request for execution.

6. The method of claim 1 wherein the communication channel is a secured communication channel.

7. The method of claim 1 wherein the set of authentication information is encrypted by the first computing device.

8. The method of claim 1 wherein the created trust relationship is recognized by all other network environments employing an authentication mechanism.

9. The method of claim 1 wherein the proprietary security model comprises a set of security provisions and a set of policies specific to each computing device.

10. The method of claim 1 further comprising receiving a request to access a set of resources from a user, wherein the user is in communication with the first node of the first computing device.

11. The method of claim 10 wherein the set of authentication information is received by the first node of the first computing device from the user sending the request to access the set of resources.

12. A device comprising:
   a processor and addressable memory, wherein the device comprises a unique proprietary security model and wherein the processor is configured to:
      send a set of authentication information to a second device, wherein the second device comprises a proprietary security model different than the proprietary security model of the device;
      receive a request from the second device, the request comprising a globally unique identifier, wherein the globally unique identifier is determined by the second device authenticating the set of authentication information sent from the device to the second device;
      determine a set of properties associated with the received request, based on the determined globally unique identifier, wherein the determined globally unique identifier is associated with the set of authentication information;
      establish a trust relationship between the device comprising the unique proprietary security model and the second device comprising different security models based on the determined set of properties;
      establish a communication channel between the device and the second device based on if the trust relationship was established; and
      access a set of resources on the second device via the established communication channel and based on the globally unique identifier associated with the set of authentication information.

13. The device of claim 12 further configured to:
   initiate a request for execution of an application from a set of one or more applications based on the received request and via the established communication channel.

14. The device of claim 12 wherein the set of properties is determined via a configuration file, wherein the configuration file comprises the set of properties.

15. The device of claim 12 wherein the encrypted set of authentication information is sent via a security service residing on the device.

16. The device of claim 12 wherein the authentication information is encrypted.

17. The device of claim 12 wherein the established communication channel is a secure communication channel.

18. A system comprising:
a first computing device comprising a proprietary security model, the first computing device comprising a processor, wherein the processor is configured to:
authenticate a received set of authentication information;
determine a globally unique identifier based on the received set of authentication information; and
send the determined globally unique identifier to the requesting device;
a second computing device comprising a proprietary security model different than the proprietary security model of the first computing device, the second computing device comprising a processor, wherein the processor is configured to:
determine a set of properties associated with a received request, the received request comprising the set of authentication information; wherein the determination is based on the globally unique identifier, and wherein the globally unique identifier is associated with the set of authentication information;
establish a trust relationship between the first computing device and the second computing device each having a different proprietary security model based on the determined set of properties;
establish a communication channel based on if the trust relationship was established; and
access a set of resources on the first computing device via the established communication channel and based on the globally unique identifier associated with the set of authentication information.

19. The system of claim 18 wherein the authentication information is encrypted.

20. The system of claim 18 wherein the established communication channel is a secure communication channel.

* * * * *